UNITED STATES PATENT OFFICE.

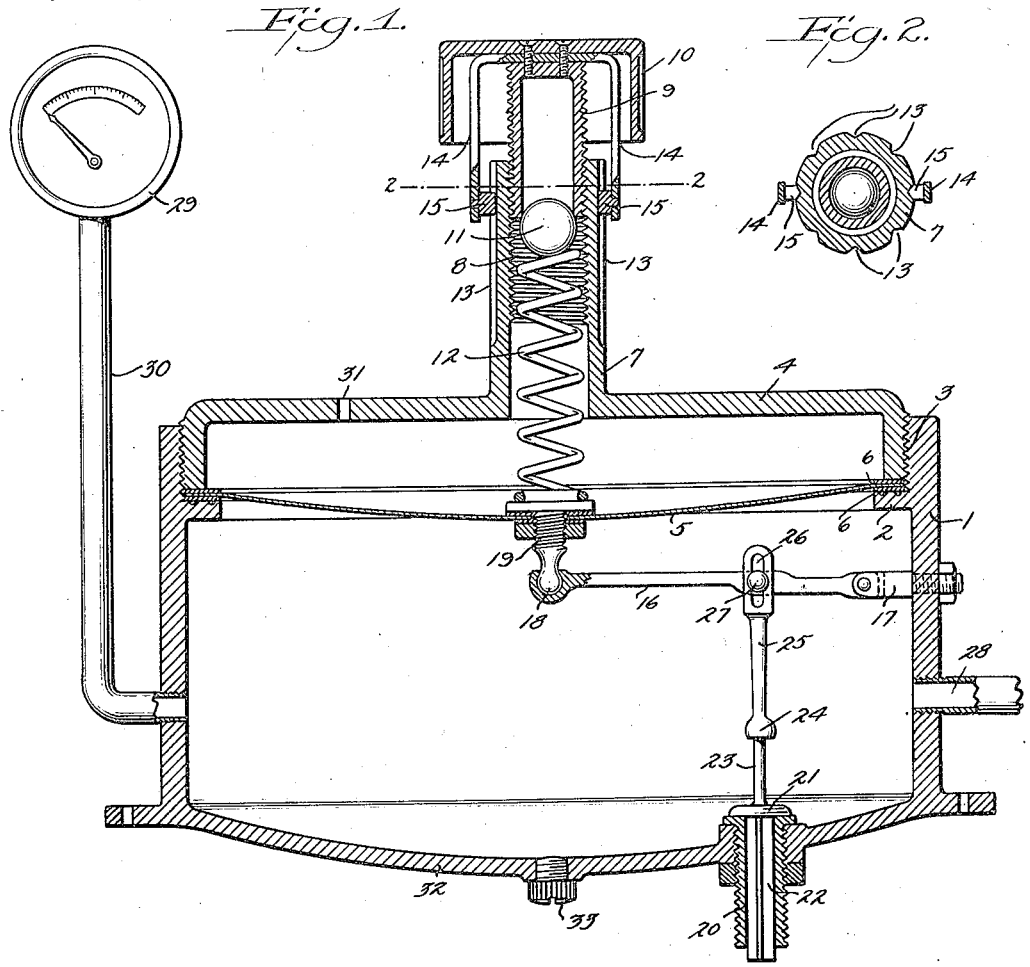

LOUIS LE BRAS, OF NEW YORK, N. Y.

PRESSURE-REGULATOR.

1,352,288.      Specification of Letters Patent.      Patented Sept. 7, 1920.

Application filed November 18, 1919. Serial No. 338,996.

*To all whom it may concern:*

Be it known that I, LOUIS LE BRAS, a citizen of France, and a resident of the city of New York, borough of Manhattan, in the county of New York and State of New York, have invented a new and Improved Pressure-Regulator, of which the following is a full, clear, and exact description.

This invention relates to improvements in pressure regulators, and more particularly to an automatic controlling device for the pressure of air utilized in liquid fuel feeding devices, such as commonly employed for internal combustion engines in connection with aviation motors or other forms of motor-propelled vehicle, an object of the invention being to provide an improved apparatus which will insure the maintenance of a uniform pressure in the liquid fuel tank for feeding the fuel to the carbureter.

With these and other objects in view the invention consists in certain novel features of construction, and combination and arrangements of parts, as will be more fully hereinafter described and pointed out in the claims.

In the accompanying drawings—

Figure 1 is a view in longitudinal section illustrating my improved device;

Fig. 2 is a view in transverse section on the line 2—2 of Fig. 1.

1 represents a casing having an internal flange 2 and internally screw threaded, as shown at 3, above the flange 2. A cover 4 is screwed into the end of casing 1 and clamps a diaphragm 5 against the flange 2. This diaphragm 5 is preferably of thin metal, and soft metal gaskets 6 are provided at opposite sides thereof and are clamped against the same to render the connection airtight.

The diaphragm 5 divides the casing into an upper air chamber and a lower chamber adapted to receive steam or liquids under pressure.

The cover 4 is provided with a tubular post 7 internally screw threaded, as shown at 8, to receive a screw threaded plug 9. A milled cap 10 is secured on the plug 9 and operates as a finger grip to facilitate the adjustment of the plug. The lower end of the plug 9 bears against a ball 11 and a coiled spring 12 is interposed between the ball and the diaphragm 5 and by adjusting the plug 9 the tension of the spring can be changed so as to regulate the pressure necessary to operate the diaphragm, as will be readily understood.

To prevent possibility of accidental movement of the plug after adjustment, I provide longitudinal grooves 13 in the outer face of the post 7 and secure spring arms 14 to the plug, providing lugs 15 at the free ends of said arms engaging in the said grooves. It is to be understood that the grooves are beveled, as shown in Fig. 2, so that the lugs will ride in and out of the grooves when the device is adjusted, but will prevent possibility of accidental movement due to vibration when the device is in use.

16 represents a lever pivotally connected at one end to a bracket 17 in casing 1 below the diaphragm 5 and having a ball and socket connection 18 with a plug 19 secured to the center of diaphragm 5. 20 represents an air outlet and 21 a disk valve normally closing the outlet and having a guide stem 22 movable in the outlet. An operating stem 23 is provided on the valve 21 and connected by a ball and socket joint 24 with a link 25. This link 25 has a longitudinal slot 26 receiving a pin 27 on the lever 16 and the slot is of the desired length to allow a predetermined movement of the lever without affecting the position of the valve.

28 represents an inlet pipe which constitutes a part of the air line of the pressure apparatus so that the casing 1 below the diaphragm is maintained in open communication with the air pressure system and hence, the device is operated by the air pressure and serves to maintain the desired pressure. A gage 29 is connected by a pipe 30 with the casing 1 so as to indicate the pressure therein, and an outlet 31 is provided in the cover 4 to maintain the upper portion of the casing in open communication with the diaphragm. The bottom 32 of the casing 1 is preferably inclined or tapering to the center where a plug 33 is provided which can be removed to allow any deposit therein to be thrown out.

The operation is as follows: When the pressure of air in the casing 1 becomes excessive, the diaphragm 5 is moved upwardly, and through the medium of the lever 16, the valve 21 is lifted to allow an escape of air until the pressure is reduced, when the diaphragm 5 moves downwardly, due to the pressure of the spring 12 to permit the closing of the valve 21. The operation is therefore entirely automatic and a uniform pressure is maintained.

The valve 21 is maintained in closed position by the pressure of air within the casing and not by the movement of the lever 16, but is opened by the movement of the lever when the pin 27 reaches the end of the slot 26, as will be readily understood.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A device of the character stated, comprising a casing, a diaphragm in the casing, a valve opened by the movement of the diaphragm when the latter moves in one direction, an internally screw threaded hollow post on the casing, a spring in the post bearing against the diaphragm, a ball on the end of the spring, a screw threaded plug in said hollow post engaging the ball, said post having longitudinal grooves in its outer face, a cap secured on said plug and spring arms secured between said cap and plug and engaging in said grooves.

2. A device of the character stated, comprising a casing, a diaphragm in the casing, a valve opened by the movement of the diaphragm when the latter moves in one direction, an internally screw threaded hollow post on the casing, a spring in the post bearing against the diaphragm, a ball on the end of the spring, a screw threaded plug in said hollow post engaging the ball, said post having longitudinal grooves in its outer face, spring arms secured to the plug, lugs on the spring arms adapted to spring into said grooves, and a cap secured on the outer end of the plug.

LOUIS LE BRAS.